United States Patent
Greenwood (10) Patent No.: US 6,392,222 B1
(45) Date of Patent: May 21, 2002

(54) MACHINE SYSTEM HAVING OPTICAL ENDPOINT CONTROL AND ASSOCIATED METHOD

(75) Inventor: Thomas A. Greenwood, Sumner, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/400,422

(22) Filed: Sep. 21, 1999

(51) Int. Cl.[7] ................................................. G06M 7/00
(52) U.S. Cl. ..................... 250/221; 250/222.1; 356/138; 359/152; 700/108
(58) Field of Search ............................ 250/203.4, 221, 250/222.1; 356/138, 139.03, 139.04, 139.06, 139.07, 141.2; 359/152, 159, 168–171; 700/108–110, 114, 192, 193

(56) References Cited

U.S. PATENT DOCUMENTS

| | | |
|---|---|---|
| 4,209,689 A | 6/1980 | Linford et al. |
| 4,714,339 A | 12/1987 | Lau et al. |
| 4,895,440 A | 1/1990 | Cain et al. |
| 5,060,304 A | 10/1991 | Solinsky |
| 5,083,866 A | 1/1992 | Dey |
| 5,117,305 A | 5/1992 | Dey |
| 5,121,242 A | 6/1992 | Kennedy |
| 5,142,400 A | 8/1992 | Solinsky |
| 5,267,014 A | 11/1993 | Prenninger |
| 5,539,562 A | 7/1996 | Morioka et al. |
| 5,633,716 A | 5/1997 | Corby, Jr. |
| 5,719,670 A | 2/1998 | Duboz et al. |
| 5,903,459 A | 5/1999 | Greenwood et al. |

FOREIGN PATENT DOCUMENTS

DE    197 29 475 C    4/1998

OTHER PUBLICATIONS

K. Lau, R. Hocken and L. Haynes, Robot Performance Measurements Using Automatic Laser Tracking Techniques, *Robotics & Computer–Integrated Manufacturing*, 1985, pp. 227–236, vol. 2, No. 3/4., USA.

L.R. Rene Mayer and Graham A. Parker, A Portable Instrument For 3–D Dynamic Robot Measurements Using Triangulation And Laser Tracking, *IEEE Transactions On Robotics and Automation*, Aug. 1994, pp. 504–516, vol. 4, New York, USA.

*Primary Examiner*—Stephone Allen
(74) *Attorney, Agent, or Firm*—Alston & Bird LLP (57) ABSTRACT

A machine system having optical endpoint control and an associated method for monitoring the position of a machine are provided which includes at least one steerable retroreflective system that defines a relatively large effective acceptance angle, typically exceeding 320°. In particular, the machine system includes a machine capable of movement in at least one direction and a steerable retroreflective system mounted upon the machine, such as upon the end effector of the machine, for movement therewith. The machine system also includes at least one light source for illuminating the retroreflector such that the position of at least a portion of the machine is determinable based upon reflections from the retroreflector. As such, the machine system can make any necessary corrections in the computer control of the machine to accommodate for differences between the anticipated position of the machine and the actual position of the machine.

26 Claims, 3 Drawing Sheets

MACHINE SYSTEM HAVING OPTICAL ENDPOINT CONTROL AND ASSOCIATED METHOD

FIELD OF THE INVENTION

The present invention relates generally to machine systems capable of being precisely positioned with respect to a workpiece and, more particularly, to machine systems having retroreflectors for permitting optical endpoint control and associated methods.

BACKGROUND OF THE INVENTION

Modern machine systems oftentimes include robots, machine tools or other mechanical positioning devices, including computer numerical control (CNC) machines, (hereinafter collectively referred to as "machines") that must be precisely positioned with respect to a workpiece in order to appropriately machine the workpiece. For example, the CNC machines employed during the manufacture of aircraft, automobiles or other vehicles must be precisely positioned with respect to the workpiece such that the resulting parts are within the relatively strict tolerances demanded by the particular application. In order to determine the position of a machine tool or a portion of a machine tool, such as the end effector of a machine tool, some machine systems include optical end point control. See, for example, U.. Pat. No. 5,903,459 which issued May 11, 1999 to Thomas A. Greenwood, et al., and which describes a precision measuring system and method, the contents of which are incorporated by reference herein. See also, U.S. patent application Ser. No. 08/867,857 filed Jun. 3, 1997 by Thomas A. Greenwood, et al., which also describes a precision measuring system and method, the contents of which are incorporated by reference herein.

Machine systems that utilize optical endpoint control include one or more retroreflectors which are mounted upon the machine to serve as targets. For example, one or more retroreflectors can be mounted upon the end effector of a machine. Machine systems that include optical endpoint control also include a laser measurement system, i.e., a laser tracker, for illuminating the retroreflectors. By detecting the light reflected by each retroreflector, the laser measurement system can determine the distance and the direction to the retroreflector. Based upon the distance of the retroreflector and the direction to the retroreflector, the position of the retroreflector and, in turn, the position of the portion of the machine that is carrying the retroreflector can be precisely determined. Based upon the determination of the actual position of the machine, the machine system can accommodate any differences that are detected between the anticipated position of the machine and the actual position of the machine. These differences in position are attributable to a wide variety of factors including expansion and contraction of the machine and the workpiece as a result of thermal changes in the factory and mechanical misalignments of and between individual axes of the machine tool. By compensating for differences between the anticipated and actual positions of the machine, the machine system can fabricate the resulting part in a much more precise and repeatable fashion.

A variety of retroreflectors have been developed to receive incident light and to reflect the light in a direction substantially parallel to the incident light. However, conventional reflectors have a relatively limited field of view known as an acceptance angle that significantly limits the applications in which retroreflectors can serve to properly reflect incident light. More particularly, light received by a retroreflector within the acceptance angle will be properly reflected by the retroreflector. However, light outside of the acceptance angle will not be reflected and, therefore, cannot be utilized to position the retroreflector. As such, the acceptance angle defined by a retroreflector restricts the position and orientation of the retroreflector relative to the light source, such as the laser tracker. This limitation is particularly disadvantageous in applications in which the retroreflector is mounted upon a machine, such as a robot or other machine tool, that can move in multiple directions and about multiple axes relative to the light source and may frequently be positioned such that the retroreflector does not face the light source, thereby preventing the light emitted by the light source from falling within the acceptance angle defined by the reflectometer. Without adding additional light sources and/or additional retroreflectors which would, in turn, increase the complexity and cost of the machine system, the position of the machine cannot therefore be determined in instances in which the incident light does not fall within the acceptance angle defined by the retroreflector, i.e., in instances in which the retroreflector does not face the light source.

Various types of retroreflectors have been developed, although each defines a relatively limited acceptance angle. One common retroreflector is a trihedral prism reflector that is frequently referred to as a solid corner cube retroreflector. The trihedral prism retroreflector has three mutually orthogonal surfaces such that light incident upon the prism is reflected generally parallel to, but laterally displaced from the incident light. While trihedral prisms are relatively inexpensive and are fairly accurate with the incident and reflected beams being parallel to within 2.0 microradians, the lateral displacement of the reflected beam from the incident beam varies due to refraction based upon the angle at which the incident light strikes the retroreflector, i.e., the incidence angle. In order to maintain accurate retroreflector properties, the trihedral prism retroreflector is therefore limited to an acceptance angle of about +/−15°.

Another type of retroreflector is a hollow corner cube retroreflector that is constructed of three mutually orthogonal mirrors. Although the lateral displacement between the incident and reflected beams does not vary as a function of the incidence angle, a hollow corner cube retroreflector is generally relatively difficult to manufacture and is accordingly more expensive than a comparable trihedral prism reflector. In addition, hollow corner cube retroreflectors typically have an acceptance angle of +/−25°.

A third type of retroreflector is a cat eye in which several hemispherical lenses are bonded to form a single optical element. While a cat eye has a larger acceptance angle, such as about +/−60°, a cat eye is significantly more expensive than a trihedral prism retroreflector or a hollow corner cube retroreflector. While a cat eye has a much greater acceptance angle than a trihedral prism retroreflector or a hollow corner cube retroreflector, the acceptance angle of a cat eye is still insufficient in many situations, particularly in many high precision manufacturing operations in which the retroreflector will be mounted upon the end effector of a robot or other machine tool that will assume many different positions during the manufacturing process.

One attempt to overcome the limited acceptance angles of conventional retroreflectors is to group a plurality of hollow corner cube retroreflectors in a cluster. Unfortunately, the clustered retroreflectors do not form a single, large, continuous acceptance angle. Instead, the clustered retroreflectors form a plurality of distinct acceptance angles with gaps between each acceptance angle. As such, certain angular regions still do not fall within the acceptance angle of any of the clustered retroreflectors. In addition, clustered retroreflectors have not been able to be constructed so as to simulate a single target since the retroreflectors have not been able to be positioned such that their apexes are coincident.

Accordingly, although machine systems having optical endpoint control have been developed, these machine systems are limited by the somewhat restricted acceptance angles of conventional retroreflectors which prevent the machine system from measuring the position of the retroreflector when the machine has assumed a position in which the retroreflector cannot be illuminated within its acceptance angle. In this regard, although a variety of retroreflectors are available, these conventional retroreflectors do not define acceptance angles that are sufficiently large and continuous as required by some applications. For example, retroreflectors that are mounted upon the end effector of a robot or other machine tool would preferably have an extremely large acceptance angle since the retroreflectors will be moved through a wide range of positions during typical machining operations. As such, in order to have the capability of precisely determining the position of a machine as the machine assumes a variety of positions such that the machine can be driven to compensate for positional inaccuracies and to form parts with precise dimensions, a need still remains for a machine system having retroreflectors that define a much larger acceptance angle than conventional retroreflectors.

SUMMARY OF THE INVENTION

A machine system having optical endpoint control and an associated method for monitoring the position of a machine are provided which includes at least one steerable retroreflective system that defines a relatively large effective acceptance angle, typically exceeding 320°. The area outside the acceptance angle is therefore a conic subtending an angle that is generally less than 40°. As such, the machine system and method can determine the position of the retroreflector and, in turn, the position of the portion of the machine upon which the retroreflector is mounted, such as the end effector of the machine, throughout the course of a machine operation even as the machine moves in different directions and rotates about different axes since the light which illuminates the retroreflector will generally fall within the relatively large acceptance angle defined by the retroreflector.

In one embodiment, the machine system includes a machine capable of movement in at least one direction and a steerable retroreflective system mounted upon the machine, such as upon the end effector of the machine, for movement therewith. The machine system also includes at least one light source for illuminating the retroreflector such that the position of at least a portion of the machine is determinable based upon reflections from the retroreflector. As such, the machine system and, in particular, the process controller or the machine controller that directs the movement of the machine can make any necessary corrections in the computer control of the machine to accommodate for differences between the anticipated position of the machine and the actual position of the machine.

The steerable retroreflective system includes a retroreflector for reflecting at least some light that is incident thereupon, as well as means for controllably steering the retroreflector. In one embodiment, the means for controllably steering the retroreflector includes at least one positioner, such as a motor, and a controller for directing the at least one positioner to controllably steer or move the retroreflector. For example, the controller may operate in a closed loop mode in order to direct the retroreflector to continuously follow the incident light beam provided by the light source. Alternatively, in an embodiment in which the at least one light source includes a plurality of light sources, the controller may operate in an open loop fashion so as to direct the retroreflector toward the incident light beam emitted by different respective light sources.

Although the steerable retroreflective system can include various types of retroreflectors, the retroreflector of one advantageous embodiment is a trihedral prism. The trihedral prism has an input surface through which incident light is received and a plurality of reflective surfaces for reflecting the incident light. The trihedral prism also defines at least one partially transmissive window opposite the input surface so that leakage light passes through the window and escapes from the trihedral prism.

In this regard, the steerable retroreflective system can also include an optical detector for detecting the leakage light that passes through the retroreflector. Based upon the leakage light detected by the optical detector, the controller can then direct the at least one positioner to controllably steer the retroreflector as desired. For example, the optical detector can define a target zone and the means for controllably steering the retroreflector can steer the retroreflector to move the leakage light toward the target zone.

Although the machine system need only include a single steerable retroreflective system, the machine system of one embodiment includes a plurality of individually steerable retroreflective systems. According to this embodiment, the machine system can also include a process controller for directing the at least one light source to sequentially point toward the retroreflectors of different respective retroreflective systems. As such, the machine system of this embodiment can determine the respective positions of several different portions of a machine based upon reflections from the retroreflectors mounted upon the different portions of the machine.

In operation, the method of monitoring the position of the machine illuminates a retroreflector with incident light and detects reflections of the light from the retroreflector. Based upon the reflected light, the position of the machine can be determined. According to the present invention, the retroreflector that is mounted upon the machine is also steered such that the retroreflector points toward the incident light. As such, the retroreflector can be steered so as to follow or track the incident light, thereby significantly increasing the effective acceptance angle of the retroreflector. Based upon the actual position of the machine as determined from the reflected light, the movement of the machine can be more precisely directed since the machine system can compensate for any differences between the anticipated position of the machine and the actual position of the machine as determined from the reflected light.

While the machine system and associated method of one embodiment includes at least one steerable retroreflective system mounted upon the machine, the steerable retroreflective system can, instead, be mounted upon the workpiece. As such, the position of the workpiece can be precisely determined by illuminating the retroreflector on the workpiece and by detecting the light reflected by the retroreflector. By controllably steering the retroreflector, such as based upon the leakage light passing through the retroreflector and detected by an optical detector, the retroreflector of this embodiment also has a larger effective acceptance angle. According to one aspect of this embodiment of the invention, the light source can be mounted upon the machine and adapted to move therewith. As such, the light reflected from the retroreflector mounted upon the workpiece will provide an indication of the relative spacing and position of the machine and the workpiece. According to another aspect of this embodiment of the invention, the light source can be remote from the machine and the workpiece, but retroreflectors can be mounted upon both the machine and the workpiece. As such, illumination of the retroreflectors mounted upon the machine and the workpiece permits the relative positions of the machine and the workpiece to be precisely determined.

By controllably steering the retroreflector, the retroreflector can effectively have an extremely large acceptance angle. For example, the retroreflector can have an acceptance angle that typically exceeds 320°. As such, the area outside the acceptance angle is a conic subtending an angle that is generally less than 40°. This design permits light to be received by the retroreflector from a much wider range of angles than conventional retroreflectors. As such, the machine system and associated method of the present invention can illuminate the retroreflector and detect reflections therefrom even as the machine moves in various directions and rotates about different axes since the retroreflector can be correspondingly steered to continuously face the light source. Thus, the movement of the machine can be more precisely directed since the actual position of the machine can be tracked during most, if not all, of the machine operations and compensation can be provided for any differences between the anticipated position of the machine and the actual position of the machine.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
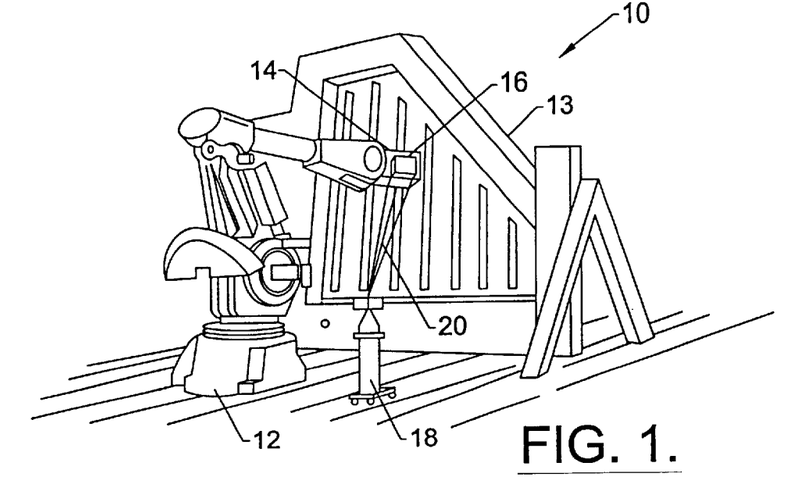
FIG. 1 is a schematic representation of a machine system that includes a plurality of steerable retroreflective systems according to one embodiment of the present invention.

Referring now to FIG. 1, a machine system 10 that includes a plurality of steerable retroreflective systems 16 according to the present invention is depicted. As shown somewhat generically in FIG. 1, the machine system includes a machine 12, such as a robot, a machine tool or other mechanical positioning device. For example, the machine can be a CNC device, such as a robotic drilling machine or the like. For purposes of illustration, however, the machine is depicted relatively generically and is capable of movement in multiple directions and about multiple axis, i.e., the machine has multiple degrees of freedom. Although not necessary for the practice of the present invention, the machine includes an end effector 14 for holding a tool, such as a drill bit or the like. Although the steerable retroreflective system of the present invention can be employed in conjunction with various machine systems, one exemplary precision machine system with which the steerable retroreflective system can be utilized is the SOMaC system as described by U.S. Pat. No. 5,903,459, the contents of which have been incorporated herein. See also U.S. patent application Ser. No. 08/867,857, filed Jun. 3, 1997 by Thomas A. Greenwood, et al., the contents of which have also been incorporated by reference herein.

As also shown generically in FIG. 1, the machine system 10 includes a plurality of steerable retroreflective systems 16 mounted upon respective portions of the machine 12. For example, steerable retroreflective systems can be mounted upon opposite sides of the end effector 14 of the machine to insure that at least one of the retroreflectors is within view at all times. However, the steerable retroreflective systems can be mounted upon other portions of the machine or upon the workpiece or part 13 as described hereinbelow without departing from the spirit and scope of the present invention.

The machine system 10 also includes at least one laser measurement system (LAS) 18, i.e., laser tracker, for illuminating the steerable retroreflective system 16. As shown in FIG. 1, for example, the machine system can include two or more laser trackers. Real time three dimensional laser measurement systems are state of the art measurement systems that obtain large quantities of accurate three dimensional data in a rapid fashion. These laser measurement systems typically include an absolute ranging capability and a motorized angle steering head to steer the laser beam. A laser measurement system also includes a feedback system that controls the steering by continually driving the laser beam to follow or track the retroreflector. As shown in FIG. 1, the laser beam 20 emitted by the laser measurement system is directed from the laser tracker head toward the steerable retroreflective system 16 mounted on the end effector 14 of the machine 12. By measuring the return beam, the laser tracker head of the laser measurement system can determine both the distance and the direction to the retroreflector, i.e., both the horizontal and vertical angles, as well as the range. These three measurements, i.e., range, horizontal angle and vertical angle, establish a spherical coordinate system that can be easily transformed into a Cartesian coordinate system. A variety of commercially available or custom built laser trackers can be employed. Additional details regarding laser tracking systems are provided by U.S. Pat. No. 5,903,459, the contents of which have been incorporated by reference herein.

During a machining operation, a part 13 is generally held in a fixed position, as shown in FIG. 1. A machine 12 is then positioned proximate the part such that the tool carried by the end effector 14 can contact and machine the part, as desired. In order to precisely determine the position of the end effector, the laser tracker 18 will illuminate the end effector and, in particular, the steerable retroreflective system 16 carried by the end effector. As will be apparent, the machine will frequently reposition the end effector during the machining process. In conventional machine systems that include a retroreflector mounted upon an end effector, the end effector would frequently be moved such that the laser beam 20 would no longer be within the acceptance angle defined by the retroreflector. According to the present invention, however, the steerable retroreflective system is provided that may be mounted upon the end effector and steered through a wide range of angles, thereby providing a much larger effective acceptance angle than conventional retroreflectors. For example, the steerable retroreflective system of the one embodiment of the present invention has an acceptance angle exceeding 320°. The area outside the acceptance angle is therefore a conic that subtends an angle that is less than 40°. As such, the steerable retroreflective system can continue to receive the laser beam emitted by the laser tracker even as the end effector is moved into various positions. Accordingly, the machine system 10 of FIG. 1 can determine the position of the retroreflector and, in turn, the position of the end effector in almost all of the positions that the end effector will assume.

Figure 2:
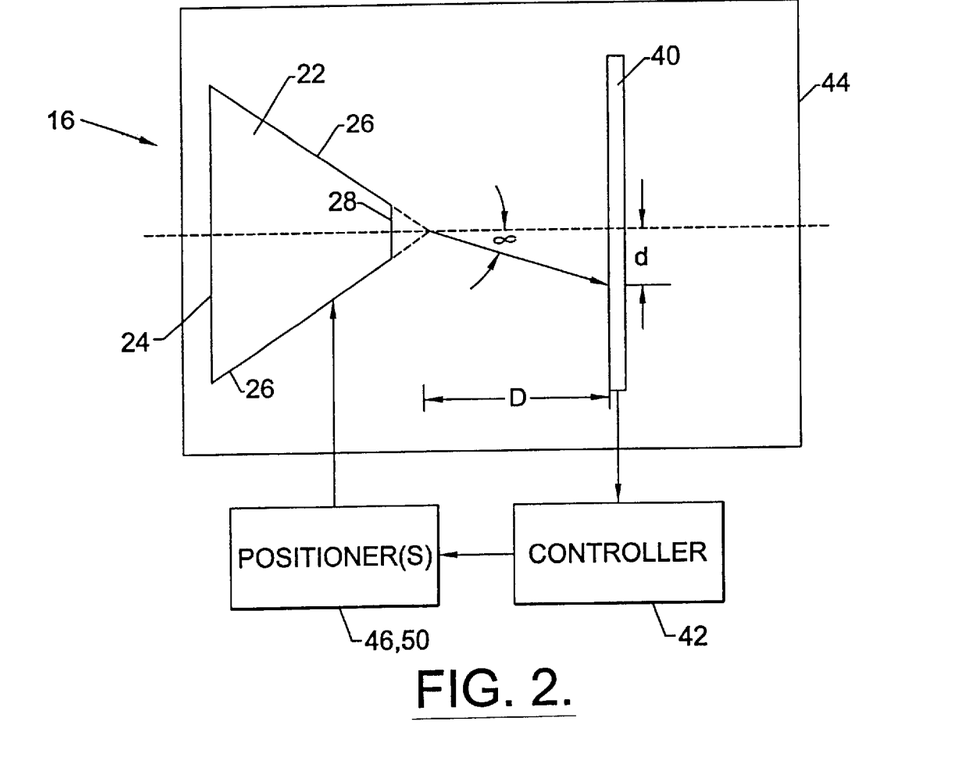
FIG. 2 is a schematic representation of a steerable retroreflective system according to one embodiment of the present invention.

As shown in more detail in FIG. 2, the steerable retroreflective system 16 includes a retroreflector 22 for reflecting at least some of the light that is incident thereupon. See, for example, the steerable retroreflective systems described in co-pending U.S. patent application Ser. No. 09/400,421 entitled "STEERABLE RETROREFLECTIVE SYSTEM AND METHOD" filed concurrently herewith, the contents of which are also incorporated herein. In one advantageous embodiment, the retroreflector is a trihedral prism having an input surface 24 through which incident light is received and the plurality of reflective surfaces 26 for reflecting the incident light. As known to those skilled in the art, the reflective surfaces are generally mirrored to facilitate reflection of the incident light. However, the retroreflector is designed to permit a portion of the incident light to escape from the retroreflector without being reflected thereby. As shown in FIG. 2, for example, the trihedral prism defines a window 28 opposite the input surface such that the plurality of reflective surfaces converge at the window. The window is at least partially transmissive such that light incident upon the window passes therethrough and escapes from the trihedral prism. In order to permit the light to leak through the window, the window is preferably free of any mirrored coating.

For a window of a given transmissivity, the percentage of the incident light that is allowed to leak through the window 28 is defined by the size of the window relative to the input surface 24 of the trihedral prism. In one embodiment, the window is sized such that between about 0.5% and 5% of the light received through the input surface of the trihedral prism passes through the window. More preferably, the window is sized such that about 1% of the light received through the input surface of the trihedral prism passes through the window.

The retroreflector 22 can be constructed so as to permit a predetermined percentage of the incident light to leak therethrough in a variety of manners. According to one advantageous embodiment, however, the apex of a trihedral prism is truncated or removed. See, for example, FIG. 2 in which the truncated apex is depicted in dashed lines. In order to fabricate the prism with a truncated apex, the trihedral prism can be secured within a mount such that the apex of the prism protrudes through an aperture defined by one surface of the mount. For example, the trihedral prism can be secured within an aluminum mount by means of an epoxy formed of 50% beeswax and 50% treepitch. In order to protect the trihedral prism during the grinding process, a sacrificial glass layer that also defines an aperture in a medial portion thereof can be secured to the surface of the mount through which the apex of the prism protrudes such that the apertures defined by the mount and the sacrificial glass layer are aligned. The apex of the prism and the sacrificial glass layers are then ground until a window of a predetermined size has been defined.

As shown in FIG. 2, the steerable retroreflective system 16 also includes an optical detector 40, such as a photocell, for detecting the leakage light that passes through the retroreflector 22. As described below, the optical detector detects the relative position of the leakage light such that the incidence angle $\alpha$ can be determined. The steerable retroreflective system also preferably includes a controller 42, such as a microprocessor or the like, for receiving signals from the optical detector and for determining the incidence angle. In this regard, the controller can determine the incidence angle $\alpha$ by the following equation: $\alpha = \tan-1 (d/D)$ wherein D is the predetermined separation distance between the optical detector and the virtual apex of the retroreflector and d is the offset of the leakage light that passes through the retroreflector from the center or other reference location defined by the optical detector.

Figure 3:
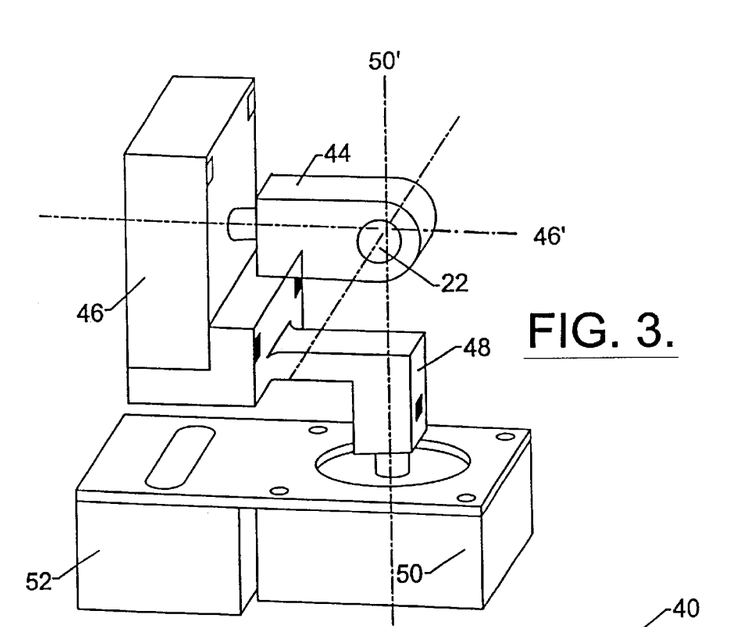
FIG. 3 is a perspective view of a steerable retroreflective system according to one embodiment of the present invention.

As shown in FIG. 3, the retroreflector 22 and the optical detector 40 are typically mounted within a housing 44. The housing, in turn, is mounted to the object to be monitored, such as the end effector 14 of a machine 12 or the workpiece 13, so as to move therewith. As described below, however, the retroreflector can also be controllably positioned relative to the object to be monitored. In this regard, the steerable retroreflective system 16 includes means for controllably steering the retroreflector in response to the leakage light detected by the optical detector. In one advantageous embodiment, the means for controllably steering the retroreflector includes at least one positioner for moving the retroreflector and a controller 42, such as the microprocessor described above, that directs the at least one positioner to controllably steer the retroreflector in response to the leakage light detected by the optical detector.

As shown in FIG. 3, for example, the at least one positioner can include first and second motors for moving the retroreflector 22 about respective axes. In this regard, the means for controllably steering the retroreflector can include a first motor 46, such as a first stepper motor, having a shaft connected to the housing 44 in which the retroreflector and the optical detector are disposed. As such, the controller 42 can actuate the first motor so as to rotate the shaft and, in turn, rotate the retroreflector about the axis 46' defined by the shaft. As shown in FIG. 3, the first motor can be mounted in a first motor mount 48. In addition, the means for controllably steering the retroreflector can include a second motor 50, such as a second stepper motor, having a shaft connected to the first motor mount. As such, the controller can actuate the second motor so as to rotate the shaft and, in turn, the first motor mount, the first motor and the housing that includes the retroreflector and the optical detector since each of these components is connected to the shaft of the second motor. In particular, the second motor rotates the first motor mount, the first motor and the housing about the axis 50' defined by the shaft of the second motor. Preferably, the axes defined by the shafts of the first and second motors intersect at the apex of the retroreflector such that the apex of the retroreflector remains in the same position and the remainder of the retroreflector is pivoted thereabout upon actuation of the first and/or second motors. As also shown in FIG. 3, the second motor is typically mounted to a second motor mount 52 which, in turn, is fixed to the object to be monitored, such as the end effector 14 of a machine 12 shown schematically in FIG. 1. As such, the controlled actuation of the first and second motors can controllably steer the retroreflector relative to the object upon which the steerable retroreflective system mounted.

Although not depicted in FIG. 3, the controller 42 is preferably in electrical communication with each of the first and second stepper motors 46, 50 so as to controllably actuate the first and second stepper motors. In addition, although the means for controllably steering the retroreflector 22 according to one advantageous embodiment is depicted in FIG. 3, the steerable retroreflective system 16 can include other means for controllably steering the retroreflector without departing from the spirit and scope of the present invention.

Figure 4:
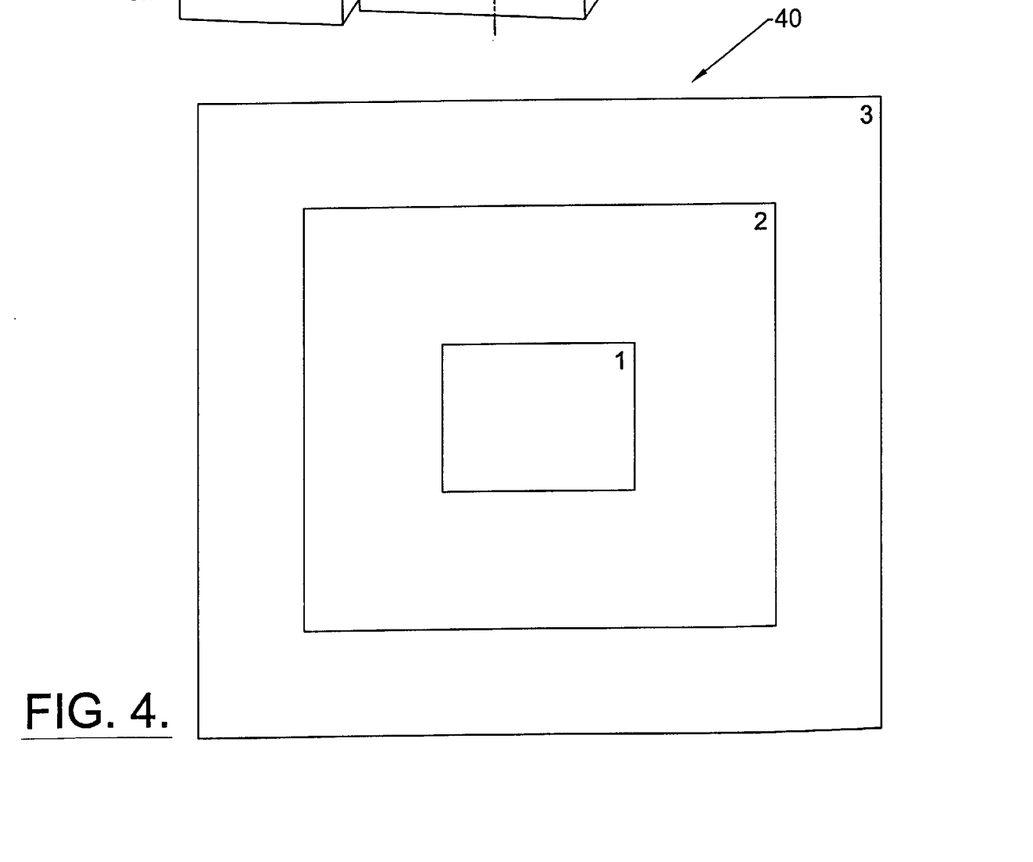
FIG. 4 is a schematic view of an optical detector of a steerable retroreflective system according to one embodiment of the present invention which illustrates the different zones defined by the optical detector.

The retroreflector 22 can be steered in any manner desired by the operator of the machine system 10, as described below. For example, the retroreflector can be steered in an open loop fashion through a sequence of positions, each of which are defined in advance. Alternatively, the retroreflector can be steered by the controller 42 in a closed loop fashion so as to follow or track the incident light. In this respect, the steerable retroreflective system 16 can track the incident light in a variety of fashions. In one embodiment, for example, the optical detector 40 defines a target zone and the controller steers the retroreflector to maintain the leakage light within the target zone. By maintaining the leakage light within the target zone, the controller also will steer the retroreflector to follow the incident light. By way of example, the optical detector depicted in FIG. 4 is divided into three zones designated 1, 2, and 3. In this embodiment, the leakage light is preferably maintained within zone 2, i.e., the target zone. As such, the controller will steer the retroreflector in instances in which leakage light is detected in either zone 1 or zone 3 so as to move the leakage light into zone 2. Although the controller can implement various control techniques in order to analyze the output of the optical detector and, in turn, instruct the first and second motors 46, 50 so as to appropriately position the retroreflector, the controller of one advantageous embodiment employs a fuzzy logic technique, while the controller of another embodiment employs a proportional integral differential technique.

Figure 5:
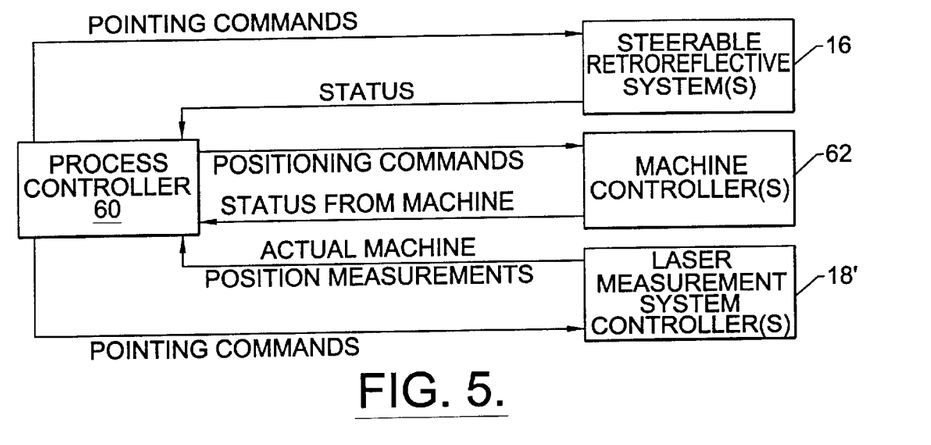
FIG. 5 is a schematic representation of a machine system of one embodiment of the present invention that indicates the interrelationship between the various components and the signals that pass therethrough.

Although the retroreflective targets 22 can be utilized in conjunction with a variety of machine systems 10, the control circuitry of the machine system of one advantageous embodiment is depicted in FIG. 5. As shown, the machine system includes a process controller 60, such as a central computer, a central processor or the like, for controlling the operations of one or more machines 12, such as by providing the numerical control required by CNC machines. According to the present invention, the machine system of this embodiment also includes one or more steerable retroreflective systems 16 mounted upon the machines and one or more laser measurement systems 18 for illuminating the retroreflective targets. In operation, the process controller directs the machines and, more typically, the machine controllers 62 associated with each of the machines to perform the desired machining operations in accordance with the prestored computer program. As indicated by FIG. 5, the machine controller associated with each of the machines operated by the process controller would also generally provide the process controller with signals indicative of the status of the machine controller. In one embodiment, the machine controller also serves as the controller 42 for the steerable retroreflective systems mounted upon the machine. However, the machine controllers and the controllers of the steerable retroreflective systems are typically distinct controllers.

Figure 6:
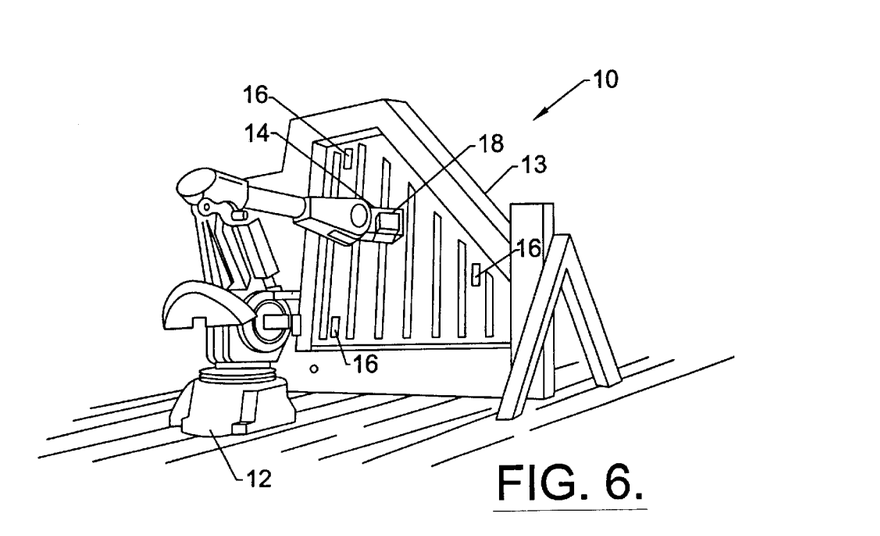
FIG. 6 is a schematic representation of a machine system that includes a steerable retroreflective system mounted to a workpiece according to another embodiment of the present invention.

In accordance with the present invention, the machine system 10 includes at least one and, more typically, a plurality of steerable retroreflective systems 16. As shown in FIG. 1, the steerable retroreflective systems can be mounted upon different portions of the machine 12. Alternatively, as depicted in FIG. 6 and as described hereinbelow, the steerable retroreflective systems can be mounted, instead, upon the part or workpiece 13, if so desired. Regardless of the location of the steerable retroreflective systems, each steerable retroreflective system includes a retroreflector 22 and means for controllably steering the retroreflector as described above. In conjunction with the steering of the retroreflector, the machine system of the present invention can be configured such that the process controller 60 provides commands to the steerable retroreflective systems that dictate the position to which the retroreflector should be steered. See FIG. 5. Alternatively, the steerable retroreflective system can be preprogrammed with instructions which dictate the manner in which the retroreflector should be steered such that the process controller need not provide directions to the steerable retroreflective systems during the machining operations. In either embodiment, the steerable retroreflective systems can also optionally provide status information to the process controller. For example, this status information may include a status signal indicating that the steerable retroreflective system is operable and a signal indicating that the retroreflector is currently being illuminated.

As shown in FIG. 5, the machine system 10 also typically includes one or more laser measurement systems; each of which includes, among other components, a laser measurement system controller 18' that drives the motorized angle steering head so as to appropriately steer the laser beam 20. As such, the process controller 60 can provide commands to the laser measurement system controllers in order to dictate the direction in which the laser beam is to be steered. Based upon the signals reflected from the respective retroreflectors 22, the laser measurement system controllers can determine the actual position of the retroreflectors and, in turn, the actual position of the portion of the machine 12 or part 13 upon which the retroreflectors are mounted. As shown in FIG. 5, the laser measurement system controllers can then transmit signals indicative of the actual position of the retroreflectors to the process controller. Based upon the signals indicative of the actual position of the retroreflectors and, in turn, the actual position of the portions of the machine or part upon which the retroreflectors are mounted, the process controller can modify the commands transmitted to the machine controllers 62 that direct the movement of the respective machines in order to compensate for differences between the actual position of the machine and the predicted position of the machine as contemplated by the CNC program. By compensating for differences between the actual position of the machine and the anticipated position of the machine, the machine system of the present invention can machine parts more accurately than conventional machine systems. In this regard, changes that occur to the part and/or the machine such as changes that occur as a result of temperature fluctuations, for example, can be accommodated by modifying the commands transmitted from the process controller to the machine controller that direct the movement of the respective machines.

The machine system 10 of the present invention can be employed in a variety of applications. For example, the machine system can be utilized with a single steerable retroreflective system 16 mounted upon a machine 12 and a single laser measurement system 18 in order to measure the XYZ position of the retroreflector according to either a static mode or a dynamic mode. In the static mode, the machine system of the present invention can measure the position of a retroreflector 22 and, in turn, the position of the portion of the machine 13 upon which the retroreflector is mounted. In the dynamic mode, the machine system repeatedly measures the position of the retroreflector and, in turn, the position of the portion of the machine upon which the retroreflector is mounted so as to effectively monitor the path along which the machine is moving. In this embodiment in which the machine system includes a single steerable retroreflective system and a single laser measurement system, the steerable retroreflective target will generally be operated in a closed-loop mode so as to track the laser beam emitted by the laser measurement system. As such, the machine can move over much greater distances and can assume many more orientations while continuing to receive the laser beam emitted by the laser measurement system within the acceptance angle defined by the retroreflector.

In another configuration, the machine system 10 can include a single laser measurement system 10 and a plurality of steerable retroreflective targets 16 mounted upon different portions of a machine 12. In order to illuminate each of these steerable retroreflective systems, the laser measurement system is preferably driven by the process controller 60 to sequentially illuminate respective retroreflectors 22, each of which is steered toward the laser measurement system in the manner described above. By measuring the relative positions of the plurality of retroreflectors, the machine system of this embodiment can advantageously determine the XYZ position of the machine as well as the pitch, yaw and roll of the machine either in a static mode, i.e., in a specific position, or a dynamic mode as the machine moves along the path of travel.

Conversely, the machine system 10 can include a plurality of laser measurement systems 18 and a single steerable retroreflective system 16 mounted upon the machine 12. In this regard, the process controller 60 preferably commands the steerable retroreflective system to sequentially point toward and track different ones of the laser measurement systems. As such, the steerable retroreflective system can operate in a closed-loop manner to track a particular laser measurement system until commanded by the process controller to point toward another laser measurement system at which point in time, the steerable retroreflective system begins to operate in an open-loop fashion so as to be moved toward the other laser measurement system. Once the steerable retroreflective system is pointing toward the other laser measurement system, the steerable retroreflective system can again operate in a closed-loop mode in order to track the other laser measurement system. The machine system of this embodiment can therefore also measure the XYZ position of the machine as well as the pitch, yaw and roll of the machine, either statically or dynamically.

Further, the machine system 10 can include both a plurality of laser measurement systems 18 and a plurality of steerable retroreflective systems 16. While the machine system of this embodiment can be configured in a variety of manners, the machine system could be configured such that each laser measurement system is assigned to illuminate a specific steerable retroreflective system in order to reduce the time required to measure the positions of a plurality of retroreflectors 22. Alternatively, the machine system could direct each laser measurement system to identify the most accessible retroreflector and to then measure the position of that retroreflector. In any event, the machine system of this embodiment can measure the XYZ position of the machine and the pitch, yaw and roll of the machine, either statically or dynamically, in real time or near real time.

As shown in FIG. 6, the steerable retroreflective systems 16 can be mounted upon the part or workpiece 13 in addition to or instead of being mounted upon the machine 12. By being mounted upon the part, the machine system 10 can illuminate the steerable retroreflective systems in order to precisely determine the position of the part without having to position the machine in a specific relationship with respect to the part. In one aspect of this embodiment, for example, steerable retroreflective systems are mounted upon both the part and the machine such that a laser measurement system 18 can precisely determine the position of both the machine and the part in order to permit the process controller 60 to precisely position the machine relative to the part. Alternatively, the laser measurement system can be mounted upon the machine, while the steerable retroreflective systems can be mounted upon the part, as shown in FIG. 6. In this embodiment, the relative positions of the machine and the part can also be determined such that the process controller can precisely position the machine relative to the part.

Regardless of whether the retroreflector 22 is mounted upon the machine 12 or the part 13, the retroreflector can effectively have an extremely large acceptance angle since the retroreflector can be controllably steered. For example, the retroreflector can have an acceptance angle of about 320° or more so as to permit light to be received by the retroreflector from a much wider range of angles than conventional retroreflectors. As such, the machine system and associated method of the present invention can illuminate the retroreflector and detect reflections therefrom even as the machine moves in various directions and rotates about different axes since the retroreflector can be correspondingly steered to continuously face the light source. Thus, the movement of the machine can be more precisely directed since the actual position of the machine can be tracked during most, if not all, of the machine operations and compensation can be provided for any differences between the anticipated position of the machine and the actual position of the machine.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A machine system having optical endpoint control comprising:

a machine capable of movement in at least one direction;

at least one steerable retroreflective system mounted upon said machine for movement therewith, said at least one steerable retroreflective system comprising:

a retroreflector for reflecting at least some light incident thereupon;

at least one positioner for moving said retroreflector; and a controller for directing said at least one positioner to controllably steer said retroreflector toward rays of light emitted by different respective light sources; and at least one light source for illuminating said retroreflector such that the position of at least a portion of said machine is determinable based upon reflections therefrom.

2. A machine system according to claim 1 wherein said means for controllably steering said retroreflector comprises:

at least one positioner for moving said retroreflector; and a controller for directing said at least one positioner to controllably steer said retroreflector to follow the incident laser beam provided by said light source.

3. A machine system according to claim 1 wherein said retroreflector comprises a trihedral prism having an input surface through which incident light is received and a plurality of reflective surfaces for reflecting the incident light, and wherein said trihedral prism defines an at least partially transmissive window opposite the input surface such that leakage light passes through said window and escapes from said trihedral prism.

4. A machine system according to claim 1 further comprising a process controller for directing movement of said machine at least partially based upon the position of said machine as determined from reflections from said retroreflector.

5. A machine system according to claim 1 wherein each steerable retroreflective system further comprises an optical detector for detecting leakage light that passes through said retroreflector.

6. A machine system according to claim 5 wherein said optical detector defines a target zone, and wherein said means for controllably steering said retroreflector steers said retroreflector to move the leakage light toward the target zone.

7. A machine system having optical endpoint control comprising:

a plurality of retroreflective systems mounted upon said machine for movement therewith, each said steerable retroreflective system comprising:

a retroreflector for reflecting at least some light incident thereupon; and means for controllably steering said retroreflector; and at least one light source for illuminating said retroreflector such that the position of at least a portion of said machine is determinable based upon reflections therefrom; and a process controller for directing said at least one light source to point toward the retroreflectors of different respective retroreflective systems.

8. A method for monitoring a position of a machine capable of movement in at least one direction, the method comprising:

illuminating a retroreflector mounted upon the machine with an incident ray of light, wherein illuminating the retroreflector comprises illuminating the retroreflector with a plurality of laser beams from different directions;

steering the retroreflector toward the incident ray of light, wherein steering the retroreflector comprises steering the retroreflector to point in the direction of different respective laser beams;

detecting reflections of the light from the retroreflector; and determining the position of at least a portion of the machine based upon the reflected light.

9. A method according to claim 8 wherein steering the retroreflector comprises positioning the retroreflector to follow the incident light.

10. A method according to claim 8 wherein steering the retroreflector comprises:

detecting leakage light that passes through the retroreflector with an optical detector having a target zone; and steering the retroreflector to move the leakage light toward the target zone such that the retroreflector points in a direction defined by the incident light.

11. A method according to claim 8 further comprising directing movement of the machine at least partially based upon the position of the machine as determined from reflections from the retroreflector.

12. A method for monitoring a position of a machine capable of movement in at least one direction, the method comprising:

steering a plurality of retroreflectors mounted upon the machine such that the retroreflector points toward an incident ray of light;

illuminating different respective retroreflectors with the incident light;

detecting reflections of the light from the retroreflector; and determining the position of at least a portion of the machine based upon the reflected light.

13. A machine system capable of being precisely positioned relative to a workpiece, the machine system comprising:

a machine capable of movement in at least one direction;

at least one steerable retroreflective system mounted upon the workpiece, said at least one steerable retroreflective system comprising:

a retroreflector for reflecting at least some light incident thereupon; and means for controllably steering said retroreflector; and at least one light source for illuminating said retroreflector such that the relative position of at least a portion of said machine to the workpiece is determinable based at least in part upon reflections from said retroreflector.

14. A machine system according to claim 13 wherein said means for controllably steering said retroreflector comprises:

at least one positioner for moving said retroreflector; and a controller for directing said at least one positioner to controllably steer said retroreflector to follow the incident light provided by said light source.

15. A steerable retroreflective system according to claim 13 wherein said retroreflector comprises a trihedral prism having an input surface through which incident light is received and a plurality of reflective surfaces for reflecting the incident light, and wherein said trihedral prism defines an at least partially transmissive window opposite the input surface such that leakage light passes through said window and escapes from said trihedral prism.

16. A machine system according to claim 15 further comprising a process controller for directing movement of said machine at least partially based upon the relative position of at least a portion of said machine to the workpiece as determined from reflections from said retroreflector.

17. A machine system according to claim 13 wherein said at least one light source is mounted upon said machine and adapted to move therewith.

18. A machine system according to claim 13 further comprising a retroreflector mounted upon said machine and adapted to move therewith, wherein said at least one light source also illuminates said retroreflector mounted upon the machine such that the relative position of the machine to the workpiece is determinable based upon reflections from both said reflectometer mounted upon the machine and said reflectometer mounted upon the workpiece.

19. A machine system according to claim 13 wherein each steerable retroreflective system further comprises an optical detector for detecting leakage light that passes through said retroreflector.

20. A machine system according to claim 19 wherein said optical detector defines a target zone, and wherein said means for controllably steering said retroreflector steers said retroreflector to move the leakage light toward the target zone.

21. A method for precisely positioning a machine relative to a workpiece, the method comprising:

steering a retroreflector mounted upon the workpiece such that the retroreflector points toward an incident ray of light;

illuminating the retroreflector with the incident light;

detecting reflections of the light from the retroreflector; and determining the relative position of at least a portion of the machine with respect to the workpiece based at least in part upon the reflected light.

22. A method according to claim 21 wherein steering the retroreflector comprises positioning the retroreflector to follow the incident light.

23. A method according to claim 21 wherein steering the retroreflector comprises:

detecting leakage light that passes through the retroreflector with an optical detector having a target zone; and steering the retroreflector to move the leakage light toward the target zone such that the retroreflector points in a direction defined by the incident light.

24. A method according to claim 21 further comprising directing movement of the machine at least partially based upon the position of the machine as determined from reflections from the retroreflector.

25. A method according to claim 21 wherein illuminating the retroreflector comprises illuminating the retroreflector with light emitted by a light source mounted upon the machine and adapted for movement therewith.

26. A method according to claim 21 further comprising illuminating another retroreflector mounted upon the machine and adapted for movement therewith, wherein determining the relative position comprises determining the relative position of the machine with respect to the workpiece based upon reflections from the retroreflector mounted upon the workpiece and the retroreflector mounted upon the machine.

* * * * *

UNITED STATES PATENT AND TRADEMARK OFFICE
CERTIFICATE OF CORRECTION

PATENT NO.    : 6,391,959 B1
DATED         : May 21, 2002
INVENTOR(S)   : Ninomiya et al.

It is certified that error appears in the above-identified patent and that said Letters Patent is hereby corrected as shown below:

Column 13,
Line 63, please change "PEP" to -- FEP --.

Column 16,
Table 1, Example 4, row 5, please change "5" to -- 0 --;
Example 5, row 5, please change "0" to -- 5 --.

Column 22,
Line 21, please change "60º C" to -- 160º C --.

Signed and Sealed this

Twenty-second Day of October, 2002

Attest:

Attesting Officer

JAMES E. ROGAN
Director of the United States Patent and Trademark Office